United States Patent Office.

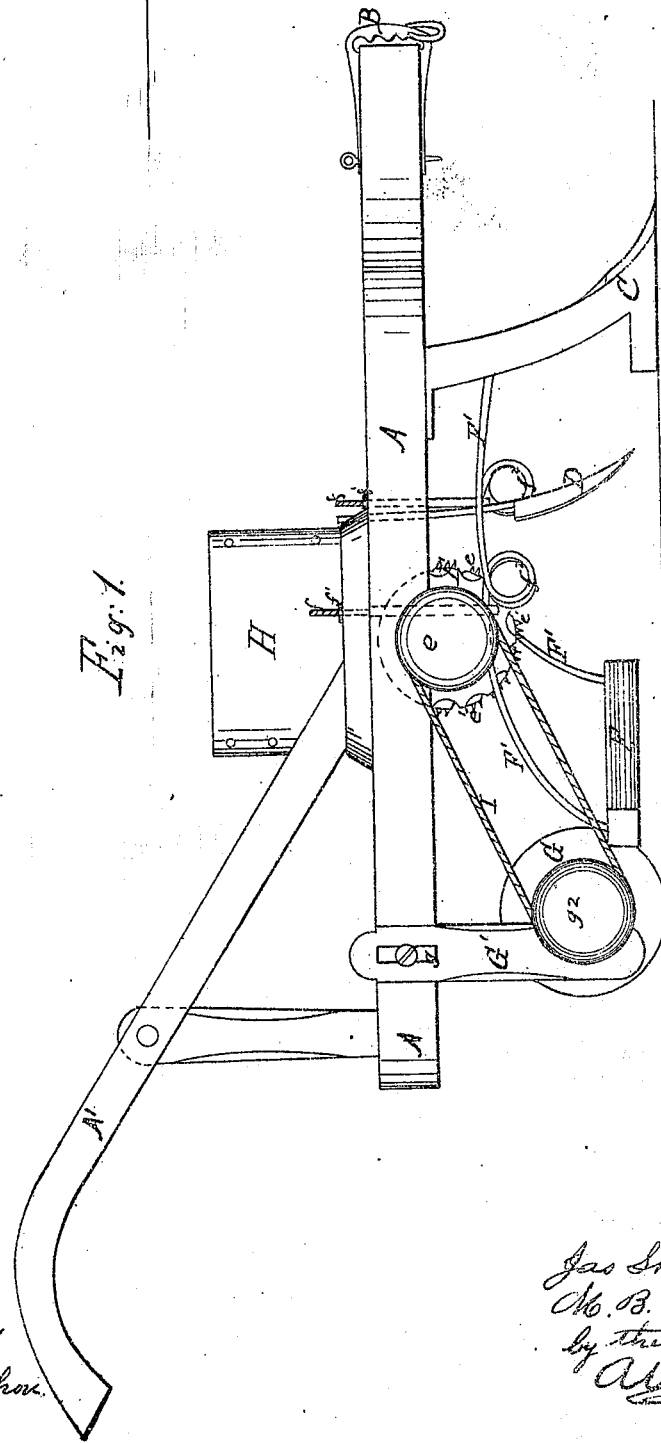

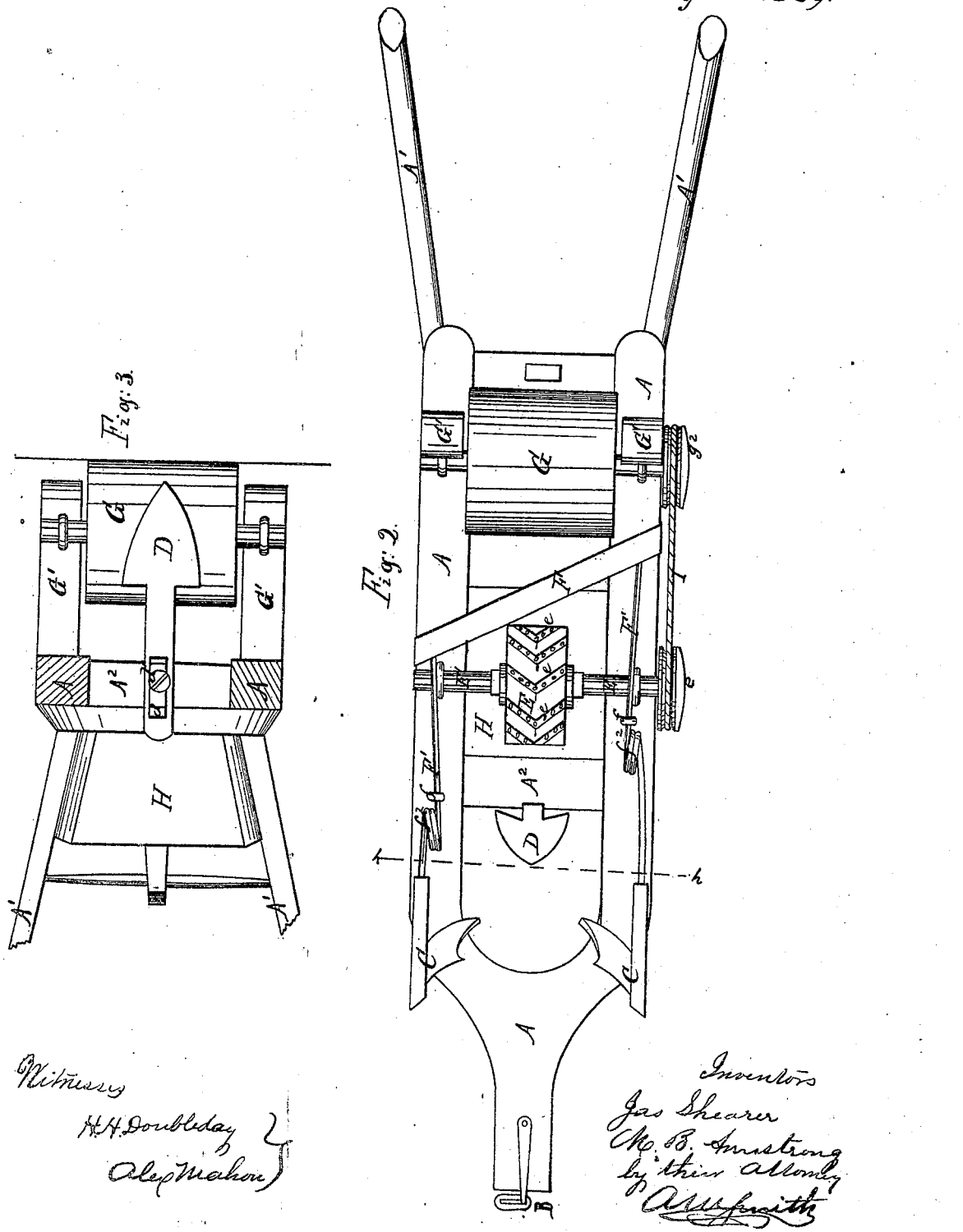

JOSEPH SHEARER AND M. B. ARMSTRONG, OF TIMBERSVILLE, ILLINOIS.

*Letters Patent No. 92,481, dated July 13, 1869.*

---

IMPROVEMENT IN COTTON-SEED PLANTERS.

---

The Schedule referred to in these Letters Patent and making part of the same.

---

*To all whom it may concern:*

Be it known that we, JOSEPH SHEARER and M. B. ARMSTRONG, of Timbersville, (Armstrong Post Office,) in the county of Wabash, and State of Illinois, have invented certain new and useful Improvements in the Construction of Cotton-Seed Planters, of which the following is a full, clear, and exact description, reference being had to the accompanying drawings, making part of this specification, in which—

Figure 1 is a side elevation of the planter;

Figure 2 is a plan or bottom view; and

Figure 3 is a partial vertical sectional view through the line $x\ y$, fig. 2, showing the manner of adjusting the furrowing-blade or tooth.

Similar letters of reference indicate corresponding parts in all the figures.

The invention consists of a novel construction and arrangement of parts, whereby a more perfect adjustment of the planter, with reference to the height of the ridge or furrow in which the seed is to be planted, as well as of the depth to which the seed is covered, may be effected, as the nature and condition of the soil may require, which will be fully understood from the following description of its construction and operation.

In the drawings—

A represents the frame or bed-piece, made of one or more pieces, as may be convenient.

A' A' are handles, to assist in guiding the planter.

B is a clevis, of the ordinary construction, and attached to the front end to draw the planter by.

C C are two ridging-plows, rigidly secured to frame A.

The mould-board of one of these plows turns a furrow to the right, and the other turns it to the left, and thus are arranged, so as to throw the two furrows toward each other, thereby forming a ridge.

Through the centre of this ridge the blade D, constructed substantially like an ordinary cultivator-tooth, makes a trench or drill, adapted to receive the seed, which is delivered from the distributer E.

The blade or tooth D is attached to the front side of transverse bar $A^2$, the vertical adjustment of said tooth being provided for by slot $d$ and bolt $d'$.

F is a rake, which covers the seed, by scraping back into the trench a portion of the earth thrown out by the tooth D.

The rake F is supported upon elastic rods $F^1\ F^1$, secured against backward strain by having their forward ends attached to the shanks of the plows C C.

This method of securing the rake is at once cheap, expeditious, and durable.

The shanks of the plows can be cast with the holes in them, then the rods may be inserted and riveted, and when once in are permanent, because, being metal to metal, the joint may be made rigid, and it will not loosen as easily as if the rods were attached to the wooden frame of the planter.

In order to give these rods the desired elasticity, and yet have sufficient strength, they are formed with a scroll, as shown at $f^2$.

The rake is adjusted vertically by means of the standards $f\ f$ and nuts $f^1\ f^1$.

G is a roller, following the rake and packing the earth slightly, and also furnishing a support for the rear end of frame A A through the standards G' G', having bearings formed in or attached to their lower ends for the axle of the roller G.

Said standards are adjustably connected with frame A by bolts $g^1\ g^1$ passing through slots $g\ g$.

H is a hopper, provided at the bottom with a slot, through which the seed is delivered by the distributer E, mounted on shaft E', revolving in suitable bearings, and rotated by belt I passing around the sheaves or grooved pulleys $g^2\ e$.

The periphery of distributer E is grooved or fluted, each groove or channel extending diagonally half way across the face of the wheel, and meeting a similar groove running in an opposite direction, as shown in fig. 2.

$e'$ are spurs, to prevent the seed from arching in hopper H.

From the foregoing description, it will be seen that this planter is susceptible of a greater variety of adjustments than any one now in use.

For instance, to plant deeper, drop the tooth D, as described, and in order to cover more deeply, lower the rake F, and in case that alone fails to effect change enough, then drop the tooth also; this will deepen the furrow, and will also increase the amount of earth thrown up.

To increase the height of the ridge upon which the seed is to be sown, we place the draught-ring in an upper notch in the clevis B, thus running the plows C C deeper into the ground. This necessitates raising the tooth D, or else the drill will be too deep.

The rake F must also be raised, or it will cover too deeply.

The quantity of seed sown to the acre can be regulated by changing the speed of the distributer, by varying the size of either of the wheels $g^2$ or $e$, for that purpose.

Having now described our invention,

What we claim as new, and desire to secure by Letters Patent, is—

1. In combination with the adjustable bed-piece or frame A, two ridging-plows, arranged in front of the drill-tooth, and a seed-distributer.

2. The rake F, in combination with the ridging-plows C C and drill-tooth D, substantially as set forth.

3. In combination with a device for drilling or planting seed, an adjustable scraper or rake, supported by means of elastic or yielding rods, or their equivalents.

4. In combination with a device for drilling or planting seed, a rake or scraper, for covering the seed, made adjustable, and located between the drill-tooth and roller.

5. Supporting the rake or scraper of a seed-drill against backward strain, by connecting it with the shanks of the ridging-plows.

6. The combination, in a seed-drill, of two ridging-plows, a drill-tooth, a rake, and a roller.

In testimony whereof, we have hereunto set our hands, the 21st day of April, 1869.

JOSEPH SHEARER.
M. B. ARMSTRONG.

Witnesses:
J. W. PRICE,
R. H. HUDSON.